United States Patent Office 3,230,045
Patented Jan. 18, 1966

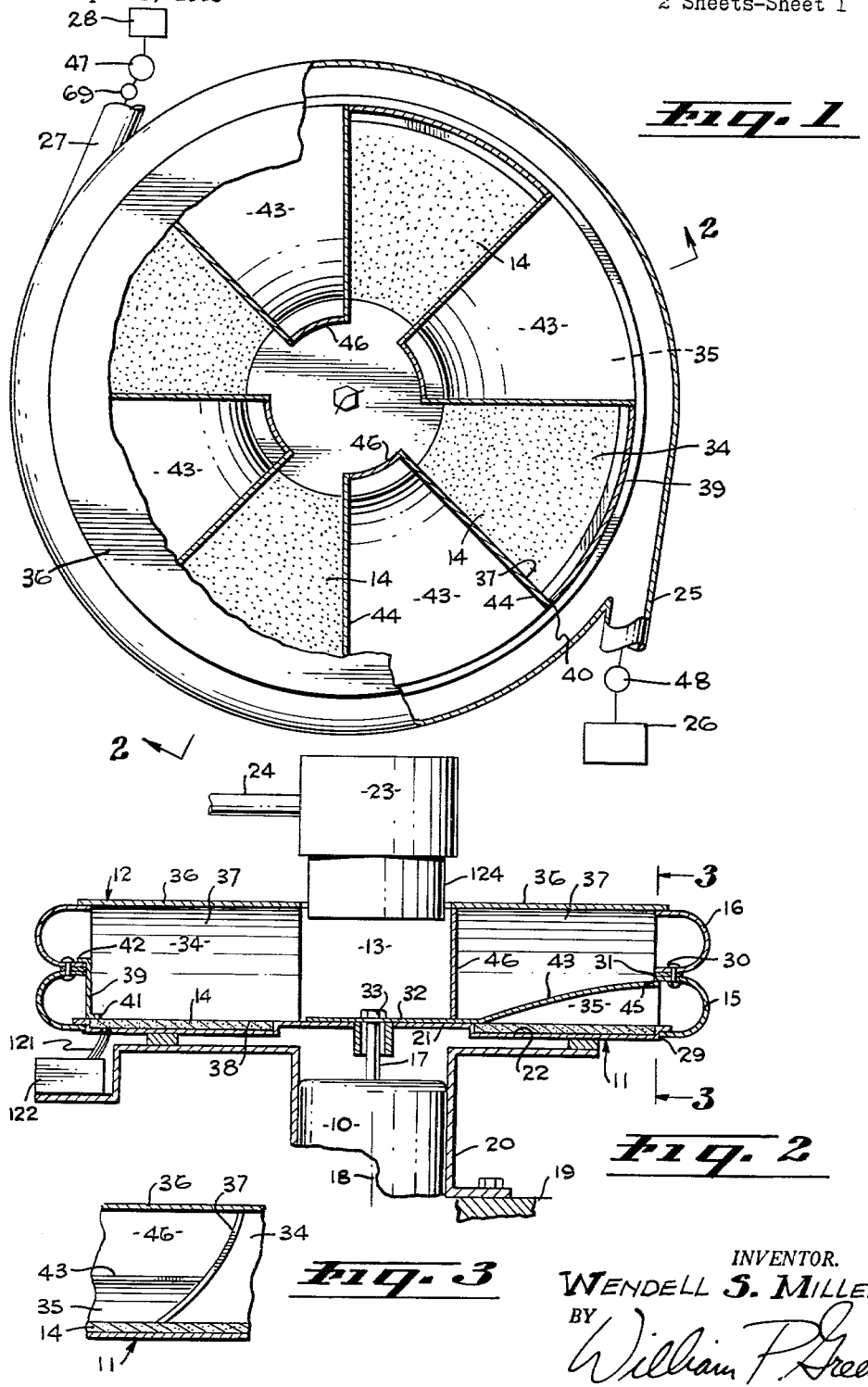

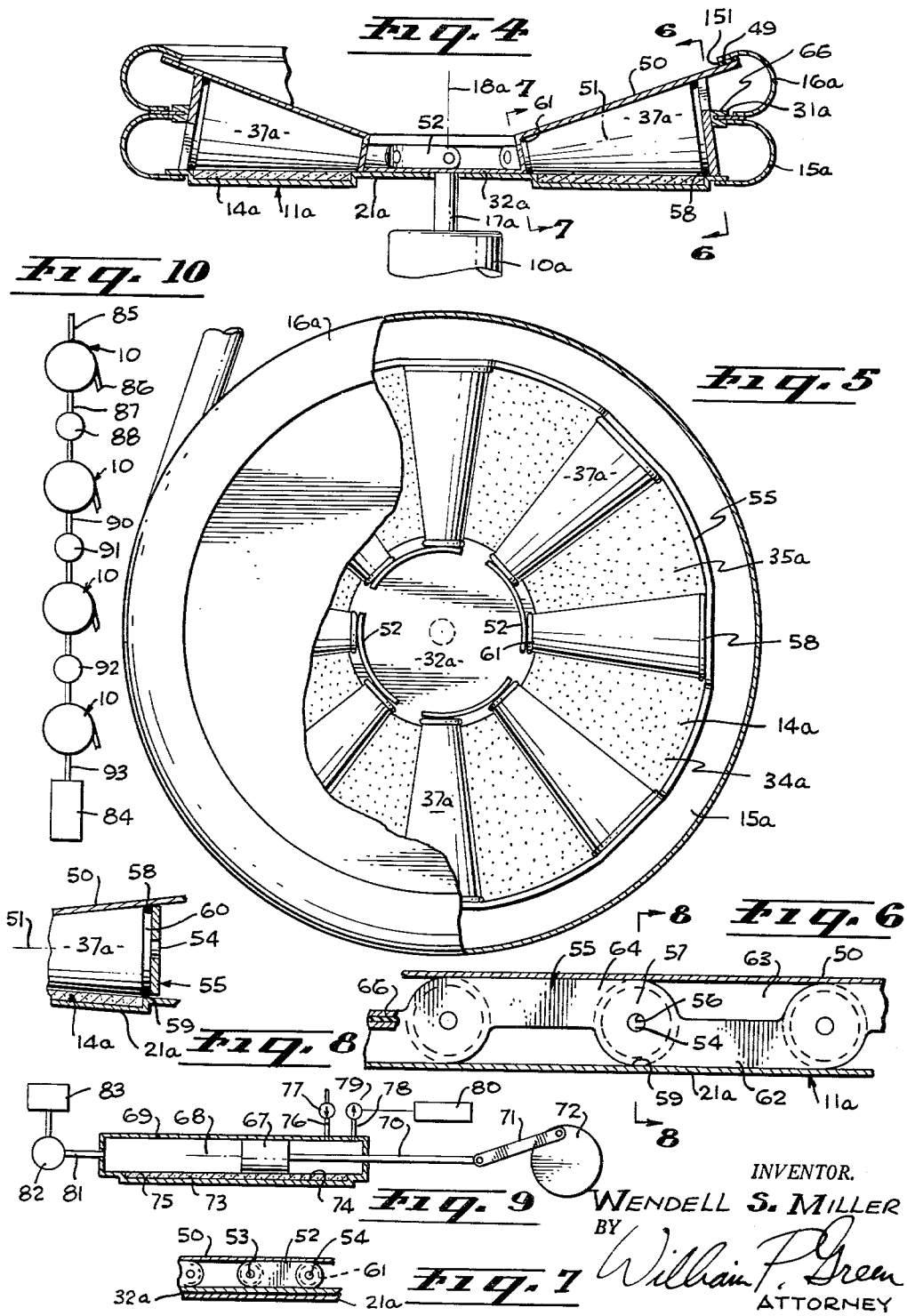

3,230,045
PROCESS AND APPARATUS FOR SEPARATING OXYGEN FROM OTHER GASES
Wendell S. Miller, 1341 Comstock Ave., Los Angeles, Calif.
Filed Sept. 1, 1961, Ser. No. 135,497
13 Claims. (Cl. 23—221)

This invention relates to improved methods and apparatus for separating oxygen from a mixture of gases, such as air, either for the purpose of producing pure oxygen, or an oxygen enriched gas, or another gas such as nitrogen in a partially or wholly oxygen-free condition.

The various conventional processes customarily employed for separating oxygen from a mixture of gases are all inherently of such a nature as to be relatively expensive in actual commercial practice, and to therefore require that the oxygen or other separated gas sell at a rather high price. With this in mind, a major object of the present invention is to provide certain improved methods and apparatus for this purpose, which methods and apparatus are capable of effecting the desired separation of oxygen from other gases much more readily, less expensively, and at a much greater rate, than has been possible with the methods heretofore employed. Particularly contemplated is an arrangement of this type in which the apparatus required for the separation is structurally very simple and easy to maintain, and can function over a long period of time to continuously separate oxygen and another gas or other gases without the necessity for regulation or adjustment of the equipment while in operation.

These results are attained in a very unique manner by taking advantage, in the present process and apparatus, of the capacity of certain chromoproteins to adsorb oxygen selectively from a mixture of gases, and then subsequently release the oxygen. In accordance with the method novelty of the invention, the mixture of gases including oxygen is contacted with the chromoprotein so that at least some of the oxygen is selectively adsorbed onto the chromoprotein, following which the remaining gases are withdrawn from the chromoprotein separately from the adsorbed oxygen. After such withdrawal of the other gases (primarily nitrogen in the case of air), the adsorbed oxygen is withdrawn from the chromoprotein in gaseous form, and may be accumulated as a body of gas isolated from the nitrogen, etc. Desirably, the initial adsorption of the oxygen is accomplished at a pressure which is substantially higher than that at which the final withdrawal of the adsorbed oxygen is subsequently effected.

To define the chromoproteins which may be utilized more specifically, these chromoproteins are referred to herein as oxyferrant chromoproteins, which term is defined as referring to any and all chromoproteins which are capable of undergoing a reversible combination with molecular oxygen. Examples of such oxyferrant chromoproteins are the hemoglobins and hemocyanin, the former being preferred. In this connection it is noted that for the purposes of this specification the term hemoglobin is to be considered as including myoglobin, which at present is felt to be the preferred substance for use in practicing the invention. It may also be pointed out that the oxyferrant chromoproteins utilized in the invention may be referred to in other terminology as consisting of the various known "respiratory pigments."

Where the gas which is desired primarily from the process is enriched or pure nitrogen, or some other gas initially mixed with oxygen, rather than the oxygen itself, I prefer to utilize a somewhat more complex process than that discussed above, which process includes at some time during the process the steps of first compressing the mixture of gases and then contacting them with an oxyferrant chromoprotein to adsorb oxygen, following which the unadsorbed gases are withdrawn and accumulated. Such compression assures more complete adsorption of the oxygen onto the chromoprotein, to thus increase the purification of the nitrogen or other gas. For maximum purification, the gas is passed through several successive cycles of oxygen adsorbing contact with a chromoprotein, with compression of the gases between successive cycles, to eventually produce a highly refined quantity of nitrogen or the like.

With regard to the oxygen separating apparatus which is contemplated by the invention, this apparatus includes means for effecting the desired contacting of a mixture of gases with the chromoprotein, and then withdrawing the oxygen and the other gas separately from the location of the chromoprotein. In certain forms of the apparatus, there are provided two sections, one of which carries the chromoprotein, and the other of which includes a plurality of chambers. The two sections are moved relative to one another in a manner such that the chambers communicate successively with the chromoprotein, with one of the chambers serving to contain a mixture of the incoming gases, and contact the chromoprotein with those gases, while the other chamber acts as a removal chamber for withdrawing adsorbed oxygen from the chromoprotein. In the presently preferred arrangement, the two sections rotate relative to one another, so that the desired relative movement of the chambers and chromoprotein is attained with minimum complexity and continuously with a simple rotary motion. In another arrangement, the contacting of the gases with the chromoprotein, and subsequent withdrawal of oxygen, are effected by means of a reciprocating type of motion.

It is desirable that the chromoprotein be maintained in moist condition during the performance of the present process. Also, it is preferable that the chromoprotein be contacted with a material such as an antibiotic or antiseptic capable of destroying bacteria which might attack the chromoprotein. For instances in which the primary purpose of the process is to produce large quantities of oxygen, with the purity of the nitrogen or other unadsorbed gases being of minor concern, the chromoprotein performs its function most effectively when it is present in conjunction with an electrolyte in aqueous solution, as for instance sodium chloride.

The above and other features and objects of the present invention will be better understood from the following detailed description of the typical embodiments illustrated in the accompanying drawings in which:

FIG. 1 is a plan view of a first type of apparatus embodying the invention, with the upper wall of the unit partially broken away to reveal the inner construction of the device;

FIG. 2 is a section taken on line 2—2 of FIG. 1;

FIG. 3 is the fragmentary developed view taken on line 3—3 of FIG. 2;

FIG. 4 is a view similar to FIG. 2, but showing a variational form of the invention;

FIG. 5 is a view similar to FIG. 1, but representing the FIG. 4 device;

FIG. 6 is a fragmentary developed view taken on line 6—6 of FIG. 4;

FIG. 7 is a fragmentary developed view taken on line 7—7 of FIG. 4;

FIG. 8 is a fragmentary section taken on line 8—8 of FIG. 6;

FIG. 9 is a somewhat diagrammatic representation of a reciprocating unit embodying the invention; and FIG. 10 is a diagrammatic representation of another form of the invention.

The form of the invention shown in FIGS. 1 to 3 is a rotary device, driven by a motor 10 (FIG. 2). This motor is stationary, as is a first section 11 of the device, relative to which the motor continuously turns a second section 12. Air enters the center of section 12 at 13, and is pumped radially outwardly through section 12 by means of a centrifugal impeller action, to pass a body of myoglobin or other oxyferrant chromoprotein contained within a carrier substance 14. Oxygen adsorbed by the chromoprotein is ultimately discharged radially outwardly into a peripheral annular header 15, with the other gas or gases being discharged into a second peripheral annular header 16.

In the arrangement illustrated in the figures, motor 10 is typically mounted in a position such that its shaft 17 turns about a vertical axis represented at 18. The housing of the motor is connected to a suitable stationary support structure represented at 19, typically by means of a plurality of mounting brackets 20. These brackets 20 also may serve to stationarily mount the non-rotating section 11 of the device.

Section 11 may include an essentially horizontal circular disk or plate 21, having an annular shallow downwardly recessed portion 22, centered about axis 18, and within which the chromoprotein carrying substance 14 is mounted. Substance 14 may take the form of an annular body or ring of filter paper or other porous material, which may be very thin vertically, say for example about one millimeter in thickness, with the filter paper having an upper horizontal surface exposed to the interior of the later to be described chambers within rotating section 12. The filter paper 14 is kept moist with an aqueous solution of the oxyferrant chromoprotein, such as a hemoglobin or hemocyanin, a hemoglobin being the preferred substance, and myoglobin being the preferred form of the hemoglobin. To maintain the paper in moist condition, there may be provided a wick 121 adapted to feed water from a water containing chamber 122 to the filter paper. Of course, any other convenient method of feeding water to the filter paper may be employed. Alternatively, or in addition to this wick-type feed, water may be supplied to the chromoprotein by passing the air which is admitted to the device at 13 through a moistening unit as represented at 23, as the air passes from an inlet 24 to a downwardly directed stationary pipe 124 leading into the central portion of the rotating structure.

The chromoprotein may be retained in fixed position on the filter paper by means of a binding agent, such as fibrin. To attain this result, whole laked blood may be applied to the filter paper and there coagulated by the addition of calcium ion, typically in the form of calcium chloride in an amount in excess of that required to neutralize or precipitate the laking agent, (normally sodium oxalate). Preferably, an antibiotic, or antiseptic e.g. penicillin, is mixed with the blood, to protect the chromoprotein from attack by bacteria. Also, as previously mentioned, it is desirable in many instances that the mixture include an electrolyte, such as sodium chloride, which of course is already present in whole blood. As an example, the following proportions are given to indicate the proportions of the various substances which may be applied to the filter paper to attain the desired results:

(1) Whole laked blood—100 cc.
(2) Calcium chloride—30 mg.
(3) Antibiotic (penicillin)—1 mg.

As will be apparent, the disk 21 is desirably formed of an imperforate metal or other material which is impermeable to fluids.

The two annular discharge headers 15 and 16 are centered about axis 18, and have the cross-section illustrated in FIG. 2, with chamber 16 being located above chamber 15. These annular chambers 15 and 16 may be essentially U-shaped in cross-section, with their open sides facing radially inwardly to receive gases from rotating unit 12. Oxygen is discharged from chamber 15 through a tangential outlet represented at 25, which leads the oxygen to a tank 26 within which it is accumulated as a body of gas. Similarly, the other gas or gases from which at least some of the oxygen has been removed are discharged through a tangential outlet 27, leading to an accumulation chamber represented at 28.

It is contemplated that discharge headers 15 and 16 may if desired be formed from the same piece of material as disk 21, or may be formed of separate elements secured together as shown. In the illustrated arrangement, the lower edge of header 15 is annularly secured to the periphery of disk 21, as by welding at 29, while the upper edge of header 15 is tightly secured, as by rivets 30, to the lower portion of header 16. An annular seal element or gasket 31 may be provided between the two headers, for preventing the leakage of any fluids outwardly therebetween.

The rotating section 12 of the device of FIGS. 1 through 3 includes a horizontal plate 32, secured by a screw or other fastening means 33 to shaft 17, to be positively driven about axis 18 by the motor. This element 32 carries a series of rotating chambers, which may be considered as a first series of circularly spaced initial contacting chambers 34, and a second series of circularly intermediate oxygen removing chambers 35. To form these chambers, rotary unit 12 has an upper annular top wall 36, from which a series of evenly circularly spaced radially extending partitions 37 extend downwardly to positions in which their lower edges 38 engage and move along the upper surface of filter paper 14 in very close proximity thereto. As will be apparent from FIG. 3, partitions 37 advance circularly in the direction of rotary motion of unit 12 (to the left in FIG. 3) as the partitions advance downwardly from top wall 36 to the filter paper, so that the partitions form scoops or vanes acting to lift gases upwardly away from the filter paper, and thereby prevent or minimize the leakage of any gases past the lower edges of partitions 37. In FIG. 1, it may be assumed that unit 12 rotates in a clockwise direction.

The outer edge of top wall 36 may overlap the upper portions of header 16 a short distance, as shown in FIG. 2, to form a substantially fluidtight seal with the header. At the locations of chambers 34, there are provided, at the radially outer extremities of these chambers, walls or partitions 39 acting to prevent the passage of any gases outwardly from chamber 34 into discharge header 15, while allowing gases from chamber 34 to pass into upper discharge header 16. For this purpose, each partition 39 may extend arcuately with respect to main axis 18, and be connected at the opposite ends of partition or wall 39 to two successive partitions 37, as by welding at 40 in FIG. 1. Partition 39 extends vertically across lower header 15 and may have a bottom arcuate flange 41 engaging and moving along filter paper 14 to form a fluid-tight seal therewith. The upper arcuate flange 42 of partition 39 may engage and slide along the upper surface of the lower portion of header 16, to form a seal with that element. Thus, air which is pumped radially outwardly through chambers 34 by the centrifugal action of section 12 is permitted to contact the upper surface of filter paper 14, and then discharges into upper header 16.

As mentioned previously, there are provided circularly between chambers 34 a series of intermediate chambers 35 within which oxygen is removed from the chromoprotein. The upper walls of these chambers 35 are formed by radially outwardly projecting extensions 43 of horizontal central disk 32 of the rotating structure. These portions 43 advance upwardly as they pass radially outwardly between two successive partitions 37, and above the chromo-protein to form the mentioned chambers 35. As will be apparent, the walls 43 are welded or otherwise secured along their opposite edges 44 to two successive partitions 37. The peripheral portions 45 of walls 43 slidably engage the under surface of the upper portion of header 15, to form a seal therewith for requiring all gases from within chambers 35 to flow outwardly into header 15. In order to prevent the flow of any air or other gases radially outwardly through the compartments formed above walls 43, these compartments may be closed at their radially inner extremities by vertical arcuate walls 46, suitably secured to the connected partitions 37 and top and bottom walls 36 and 32.

To now describe the manner of operation of the device of FIGS. 1 to 3, assume first of all that air is being admitted into unit 23 from inlet 24, and after being moistened by unit 23 is allowed to pass downwardly through tub 124 into the interior of structure 12. Also assume that electrical energy is being supplied to motor 10, so that the motor is continuously driving shaft 17 at a predetermined rate of speed to turn rotary unit 12 about axis 18 relative to the stationary section 11 of the device. As section 12 turns, the rotation of chambers 34 causes these chambers to function as a centrifugal impeller, acting to pump air radially outwardly through chambers 34 to contact the chromoprotein on filter paper 14, and then pass through header 16 and line 27 to accumulation tank 28. Preferably, a pump 47 is contained within line 27, to compress the gas within tank 28, and prevent the development of an excessive back pressure in header 16.

As air passes over the upper surface of filter paper 14, oxygen is chemically adsorbed onto the chromoprotein carried by the filter paper, so that the gas ultimately accumulated within tank or chamber 28 is less rich in oxygen than was the incoming air. Where the chromoprotein is myoglobin, the preferred substance (or another hemoglobin), the oxygen coordinates onto the ferrous iron of the myoglobin. Where hemocyanin is employed, the oxygen coordinates onto the copper of the hemocyanin. The pressure maintained within chambers 34 is controlled to be of a value sufficient to assure such coordination of the oxygen onto the chromoprotein, such control of the pressure typically being effected by regulation of a back pressure valve 69 providing a controlled restriction in the discharge line.

After a particular one of the chambers 34 has passed a certain portion of the filter paper, the next successive chamber 35 then moves to a position over that portion of the filter paper, so that the adsorbed oxygen is removed from the chromoprotein through chamber 35. Since chamber 35 has no air inlet at its radially inner end, the centrifugal pumping action of chamber 35 serves to cause all gases within that chamber to move outwardly into header 15 for accumulation in tank 26. Thus, a vacuum is maintained within chamber 35, acting to enhance the freeing of the adsorbed oxygen from the chromoprotein, so that the gas accumulated within chamber 26 is primarily oxygen. A vacuum pump 48 may be connected into line 25, to pressurize the oxygen within tank 26, and to prevent the development of a back pressure in chambers 35.

From the above discussion, it will be apparent that each individual portion of the body of chromoprotein carried by filter paper 14 is alternately placed in communication with a chamber 34, and then a chamber 35, so that oxygen is repeatedly adsorbed onto the chromoprotein and then withdrawn from the chromoprotein into discharge header 15. In this way, a continuous process is maintained for separating oxygen from air or another mixture of gases, with oxygen being accumulated within tank 26, and the remaining gases, perhaps still containing some oxygen, being accumulated within tank 28.

FIGS. 4 through 8 represent another form of the invention which is essentially very similar to that of FIGS. 1 to 3, except that the partitions between successive chambers of the rotating structure (corresponding to partitions 37 in the first form of the invention) take the form of a series of circularly spaced radially extending rollers **37*a*. In the second form of the invention, the plate 21*a* of stationary section 11*a* may be substantially identical with plate 21 of FIG. 2. The same is true of filter paper 14*a* and the chromoprotein and other substances impregnated into a carried by the filter paper. Also, discharge headers 15*a* and 16*a* may be very much the same as headers 15 and 16 except as to the provision of an upper downwardly inclined annular edge 49 at the top of header 16*a***, and as to the provision of a radially inwardly projecting annular sealing lip portion of the seal ring 31A (typically formed of rubber or the like).

Instead of top wall 36 of FIG. 2, the device of FIGS. 4 through 8 has a downwardly inclined annular frustroconical top wall 50, which rolls freely on the upper surfaces of the rollers **37*a* about main axis 18*a* of the device. An annular seal element 51, typically formed of rubber, may be positioned between edge 49 of header 16*a* and top wall or plate 50** to form an annular fluidtight seal between these parts.

Rollers **37*a* may be frusto-conical in configuration as shown, being centered about a series of circularly spaced axes 51 which advance upwardly at an angle as they advance radially outwardly from the main axis 18*a*. At its bottom, each of the rollers 37*a* engages filter paper 14*a* along a line of contact extending radially outwardly from axis 18*a* so that the roller may roll along the upper surface of the filter paper and form an effective seal preventing gas from passing from one side of the roller to the other. Similarly, the uppermost surface of each roller 37*a* has rolling line contact with the under surface of top plate 50, along a line exending essentially radially with respect to axis 18*a*, to form a fluidtight seal at this location. As will be apparent, top plate 50 rotates about axis 18*a* at a rate which is equal to twice the rate of movement of rollers 37*a*** about that axis.

For driving the rollers, shaft **17*a* of motor 10*a* rigidly carries at its upper end a horizontal or transverse plate 32*a*, which forms at its periphery a series of circularly spaced arcuate upwardly projecting rigid tabs 52 (FIGS. 4 and 7). Each tab 52 has two circularly spaced apertures 53, within which radially inner ends of shafts 54 of rollers 37*a* are rotatably received. At the radially outer extremities of rollers 37*a* (with respect to axis 18*a*), there is provided a generally annular ring 55 (FIG. 6), which extends entirely circularly about axis 18*a*, and has circularly spaced apertures 56 rotatably receiving and journalling the outer extremities of roller shafts 54. At the location of each of the rollers, ring 55 has a circular planar portion 57, disposed transversely of the axis 51 of the associated roller, and against which a rubber O-ring or seal ring 58 (FIG. 8) is annularly engageable to form an annular seal with ring 55. The upper extremity of ring 58 engages top wall 50, and the lower extremity of ring 58 engages element 21*a* at 59, to thus form an effective seal preventing the flow of any gases circularly past the other extremity of each roller 37*a*. O-ring 58 may be received within a suitable annular groove or recess 60 formed in roller 37*a*. Similarly, there may be provided at the radially inner end of roller 37*a* another rubber O-ring or seal ring 61, circularly engageable with an end portion of a corresponding one of the tabs 52, and engageable at the upper and lower extremities of element 61 with top wall 50 and bottom element 21*a***, to form a fluidtight seal preventing the flow of any gases at that location between opposite sides of the roller.

Circularly between successive rollers **37*a* the inner tabs 52 and outer ring 55 from alternate chambers 34*a* and 35*a* corresponding to chambers 34 and 35 of FIGS. 1 to 3. At the radially inner extremity of chamber 34*a*, there is an open space between successive tabs 52, allowing air from the center of the device to enter chamber 34*a* and be centrifugally pumped radially outwardly. At the radially outer extremity of each chamber 34*a*, ring 55 has a portion 62 which closes off communication between chamber 34*a* and oxygen header 15*a*, but which provides an opening 63 for passing air from chamber 34*a*** into upper header 16a. At the locations of the intermediate oxygen removal chambers 35a, on the other hand, tabs 52 prevent air from entering the radially inner ends of chambers 35a, while ring 55 has portions 64 preventing gas from chamber 35a from entering header 16a, but leaving an opening for permitting gas from chamber 35a to enter lower header 15a. To form an annular seal between headers 15a and 16a, the outer surface of ring 55 may carry an annular seal member 66, centered about axis 18a, and of U-shaped radially outwardly opening configuration, to receive the inner edge of element 31a in fluid sealing relation. In FIG. 6, this ring 66 has been broken away except at the left edge of that figure, to leave ring 55 exposed to that its unique configuration will be readily understood. As mentioned previously, the circular portions of ring 55 at the locations of the roller are desirably planar, this being for the purpose of assuring an effective annular engagement with seal rings 58. Circularly between these roller engaging portions of ring 55, the portions 62 and 64 of the ring may be arcuate.

In using the device of FIGS. 4 to 8, motor 10a is energized to continuously drive shaft 17a and disk 32a, and through tabs 52 to drive rollers 37a. Tabs 52 should be sufficiently thick, axially of rollers 37a, to effectively journal the rollers for rotation about their axes 51, and at the same time drive the rollers circularly about axis 18a. As one of the chambers 34a passes a particular portion of the filter paper 14a, the air which is centrifugally pumped radially outwardly through chamber 34a loses some of its oxygen to the chromoprotein carried by the filter paper. The unadsorbed gas or gases flow into outer header 16a, and may be accumulated within a tank as in FIG. 1. When the next successive chamber reaches the location of the chromoprotein onto which oxygen has been adsorbed, the centrifugal action within chamber 35a causes the development of a vacuum within that chamber, as in chamber 35 in FIGS. 1 to 3, so that the absorbed oxygen is removed from the chromoprotein, and is discharged into header 15a and from that header into a suitable accumulation tank. Thus, the operation of the device of FIGS. 4 through 8 accomplishes the same result as is attained in FIGS. 1 to 3.

FIG. 9 represents diagrammatically another form of the invention in which a piston 67 is reciprocated in opposite directions along an axis 68 within a cylinder 69 by means of a piston rod 70, a crank rod 71, and power operated rotary drive wheel 72. In connection with the showing of wheel 72, it is noted that this wheel is illustrated only diagrammatically in FIG. 9, and would actually be considerably larger than shown. Specifically, it would be large enough to move the piston through the entire length of the cylinder. Piston 67 is of course a tight sealed fit within cylinder 69, and both of these elements may be rectangular in transverse cross-section. The bottom wall 73 of the cylinder may be recessed slightly at 74 to contain an elongated sheet of filter paper or other porous material 75 which holds the chromoprotein and other substances contained within the filter paper of the first two forms of the invention. Piston 67 moves along the upper surface of filter paper 75 between the opposite ends of the cylinder. The right hand end of the cylinder as viewed in FIG. 9 may be placed in communication with the atmosphere, to receive air therefrom through a line 76 containing a check valve 77 adapted to pass air into the cylinder but not permit a reverse flow of air outwardly therefrom. The gases at the right-hand side of piston 67 are discharged from the cylinder through an outlet line 78, containing a check valve 79 which will pass gases from the cylinder and into an accumulation tank 80, but will not allow a reverse flow of gas. At the left-hand end of the cylinder, oxygen is discharged from the cylinder through an outlet 81, connected to the suction side of a vacuum pump 82, which discharges the oxygen into an accumulation tank 83 at a superatmospheric pressure.

In considering the operation of the FIG. 9 device, assume first that piston 67 is at the right-hand end of its stroke, received closely adjacent the right-hand end of cylinder 69. As the piston then commences its leftward movement, it draws air into the right end of the cylinder through check valve 77 and inlet line 76. This air intake continues through the entire leftward stroke of the piston, and during that stroke oxygen from the indrawn air is adsorbed onto the chromoprotein carried by filter paper 75. On the subsequent rightward stroke of piston 67, the unadsorbed gases, primarily nitrogen, are pumped by the piston past check valve 79 and into accumulation tank 80. At the same time, the rightward movement of the piston exposes most of the filter paper 75 at the left side of the piston, so that the vacuum pump 82 can withdraw oxygen from the left-hand chamber, after the oxygen is automatically freed in gaseous form from the chromoprotein, and with the oxygen being accumulated within tank 83. On later strokes of the piston, the discussed operations are repeated, so that the mechanism of FIG. 9 acts to progressively accumulate oxygen in tank 83, and air containing less than the normal amount of oxygen in tank 80.

FIG. 10 represents diagrammatically an arrangement of a series of units 10 of FIGS. 1 to 3 (or the units 10a of FIGS. 4 to 8, or the reciprocating units of FIG. 9), through which series of devices a body of air or other mixture of gases is passed in a series type of flow, to successively remove more and more of the oxygen from the air, and ultimately produce an essentially pure body of nitrogen within accumulation tank 84. Air enters the system at 85, with the oxygen separated in the first unit 10 being discharged at 86. The remaining gases from which some of the oxygen has been removed discharge from the first unit 10 through a line 87, and are then compressed by a compressor 88 before entering the second unit 10. The oxygen separated from this second unit 10 discharges at 89, with the further enriched nitrogen flowing through a line 90 to another compressor 91, to then enter the next successive unit 10, for further separation of oxygen therefrom, with recompression occuring again at 92, before passing through the final unit 10 from which the essentially pure nitrogen passes through line 93 to tank 84. If any oxygen remains in the nitrogen in line 93, it will be very small in amount, and can if desired be burned out of the nitrogen at very low cost and with very little fuel, so that the gases within tank 84 are completely inert.

In the process embodying the invention, and in utilizing any of the different forms of apparatus disclosed, it is contemplated that the temperature and pressure conditions, and other conditions, such as the amount of electrolyte present in the chromoprotein composition, may be varied to attain the results desired under any particular circumstances encountered. In most cases, it is preferred that the temperature utilized be ambient temperature, say for example between about 75° and 90° Fahrenheit, preferably about 75° F. Where the purpose of the operation is to produce large quantities of reasonably good oxygen, it is desirable to employ an electrolyte in solution in the water which suspends the chromoprotein, and to employ a fairly high temperature, say for example about 110° F. When the purpose of the operation is, however, to produce nitrogen by a stripping operation such as that shown in FIG. 10, it is more desirable to employ a dialyzed hemoglobin or other chromoprotein, and a lower temperature, say for example 75° F. Under these conditions, the pressures utilized for removing the oxygen from the chromoprotein should desirably be somewhat lower than the pressures required when the purpose is to produce oxygen. When an electrolyte is employed, such as sodium chloride, the electrolyte composition should not be too strong, but rather should be only of moderate strength, say for example about 75 milligrams per liter.

I claim:

1. The process of separating oxygen from a mixture of oxygen and at least one other gas that comprises contacting said mixture of gases with an aqueous solution of a chromoprotein capable of a reversible combination with molecular oxygen, said aqueous solution being impregnated on a porous body, selectively adsorbing at least some of said oxygen onto the chromoprotein, withdrawing said other gas from the chromoprotein separately from the adsorbed oxygen, then withdrawing said adsorbed oxygen in gaseous form from the chromoprotein, and maintaining said aqueous solution in non-flowing condition, by said porous body, throughout said process.

2. The process of separating oxygen from a mixture of oxygen and at least one other gas that comprises contacting said mixture of gases with an aqueous suspension of a hemoglobin which is carried in a porous body in an aqueous suspension and retained hereon by a binding agent, selectively adsorbing at least some of said oxygen onto the hemoglobin, withdrawing said other gas from the hemoglobin separately from the adsorbed oxygen, then withdrawing said adsorbed oxygen in gaseous form from the hemoglobin, and maintaining said aqueous suspension in non-flowing condition, by said binding agent, throughout said process.

3. Apparatus for separating oxygen from a mixture of oxygen and at least one other gas, comprising an oxyferrant chromoprotein in nonflowing condition capable of a reversible combination with molecular oxygen, first means for holding said oxyferrant chromoprotein, second means forming a plurality of chambers communicable with said chromoprotein, means for moving one of said first and second means relative to one another in a relation to bring said chambers successively into communication separately with said chromprotein, a first of said chambers being operable to contact said mixture of gases with the chromoprotein and to thereby adsorb oxygen from the mixture onto the chromoprotein, and a second of said chambers then being operable to withdraw said adsorbed oxygen from the chromoprotein in isolation from said other gas.

4. The combination as recited in claim 3 in which said second means include a roller which rolls relative to said chromoprotein and forms a partition between said first and second chambers.

5. Apparatus for separating oxygen from a mixture of oxygen and at least one other gas, comprising an oxyferrant chromoprotein in nonflowing condition capable of a reversible combination with molecular oxygen, first means for holding said oxyferant chromoprotein, second means forming a plurality of chambers communicable with said chromoprotein, means for rotating one of said first and second means relative to one another in a relation to bring said chambers successively into communication separately with the chromoprotein, a first of said chambers being operable to contact said mixture of gases with the chromoprotein and to thereby adsorb oxygen from the mixture onto the chromoprotein, and a second of said chambers then being operable to withdraw said adsorbed oxygen from the chromoprotein in isolation from said other gas.

6. Apparatus for separating oxygen from a mixture of oxygen and at least one other gas, comprising first means for holding an oxyferrant chromoprotein, second means forming a plurality of chambers communicable with said chromoprotein, and rotatable about an axis, means for rotating said second means about said axis in a relation to bring said chambers successively into communication separately with the chromoprotein, a first of said chambers being constructed to operate as a centrifugal impeller acting to impel said mixture of gases centrifugally therethrough and past said chromoprotein to adsorb oxygen onto the chromoprotein, and a second of said chambers being constructed and positioned to act as a second centrifugal impeller removing said adsorbed oxygen centrifugally from the chromoprotein.

7. The combination as recited in claim 6, including separate discharge headers communicating with said two chambers respectively and positioned to receive therefrom separately said adsorbed oxygen and the portion of said gas mixture which is not adsorbed by the chromoprotein.

8. The combination as recited in claim 6, in which said one section includes a roller which rolls relative to said chromoprotein and forms a partition between said first and second chambers.

9. Apparatus for separating oxygen from a mixture of oxygen and at least one other gas, comprising a first section, a second section, means for driving said second section rotatively about a predetermined axis, said second section forming a series of chambers at different locations circularly about said axis, an essentially annular body of an oxyferrant chromoprotein carried by said first section and disposed about said axis at a first axial side of said chambers and in communication therewith, means closing the opposite axial side of said chambers, alternate ones of said chambers being open to centrifugal flow of said mixture of gases generally radially outwardly therethrough past said chromoprotein to adsorb oxygen thereonto, the intermediate chambers between said alternate ones having walls preventing the flow of gases into the radially inner ends thereof and having discharge openings at their radially outer ends through which said adsorbed oxygen is discharged centrifugally, and two headers disposed about said series of chambers and communicating with said alternate chambers and said intermediate chambers respectively and receiving oxygen and said other gas respectively therefrom.

10. The combination as recited in claim 9, in which said second section includes a series of circularly spaced rollers turning about individual axes extending generally radially outwardly from said main axis, said rollers being positioned to roll circularly along said chromoprotein and form partitions separating successive chambers from one another, said means including a wall disposed across said second axial side of the chambers in rolling engagement with the rollers and rotatable relative to both said chromoprotein and said rollers.

11. Apparatus for separating oxygen from a mixture of oxygen and at least one other gas comprising an oxyferrant chromoprotein in nonflowing condition capable of reversible combination with molecular oxygen, first means for holding said oxyferrant chromoprotein, second means forming a plurality of chambers communicable with said chromoprotein, means for moving one of said first and second means relative to the other in a relation to bring said chambers successively into communication separately with said chromoprotein, a first of said chambers being operable to contact said mixture of gases with the chromoprotein to thereby absorb oxygen from the mixture onto the chromoprotein, and the second of said chambers then being operable to withdraw said adsorbed oxygen from the chromoprotein in isolation from said other gas, and means for hydrating said mixture of gases with water vapor prior to the introduction of said gases into said apparatus.

12. Apparatus for separating oxygen from a mixture of oxygen and at least one other gas, comprising an oxyferrant chromoprotein in nonflowing condition capable of a reversible combination with molecular oxygen, first means for holding said oxyferrant chromoprotein, second means forming a plurality of chambers communicable with said chromoprotein, means for moving one of said first and second means relative to the other in a relation to bring said chambers successively into communication separately with said chromoprotein, a first of said chambers being operable to contact said mixture of gases with chromoprotein to thereby adsorb oxygen from the mixture onto the chromoprotein, and a second of said chambers then being operable to withdraw said adsorbed oxygen from the chromoprotein in isolation from said other gas, said chromoprotein being impregnated upon a porous carrier, means for supplying water to said chromoprotein through said porous carier by capillary action.

13. Apparatus for separating oxygen from a mixture of oxygen and at least one other gas, comprising a quantity of hemoglobin, first means for holding said hemoglobin, second means forming a plurality of chambers communicable with said hemoglobin, means for moving one of said first and second means relative to the other in a relation to bring said chambers successively into communication separately with said hemoglobin, a first of said chambers being operable to contact said mixture of gases with said hemoglobin to thereby adsorb oxygen from the mixture onto said hemoglobin, and a second of said chambers then being operable to withdraw said adsorbed oxygen from the hemoglobin in isolation from said other gas.

References Cited by the Examiner
UNITED STATES PATENTS

| 1,091,023 | 3/1914 | Sinding-Larsen | 23—221 |
| 3,121,625 | 2/1964 | Broughton | 55—58 |

FOREIGN PATENTS

| 8,211 | 8/1910 | Great Britain. |
| 192,944 | 2/1923 | Great Britain. |

MAURICE A. BRINDISI, *Primary Examiner.*